April 2, 1968  A. J. LEWUS  3,376,484
SEMICONDUCTOR CONTROL CIRCUIT WITH MOVING IRON CORE
Filed Oct. 23, 1965
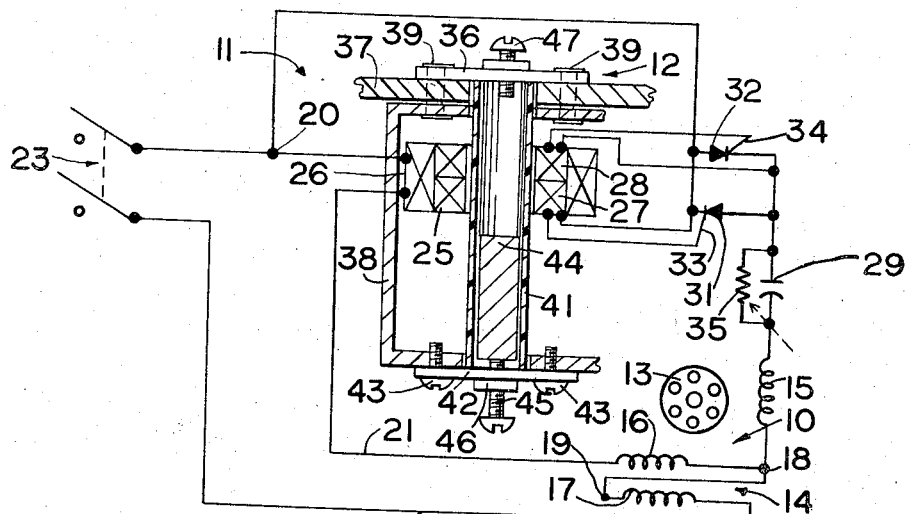
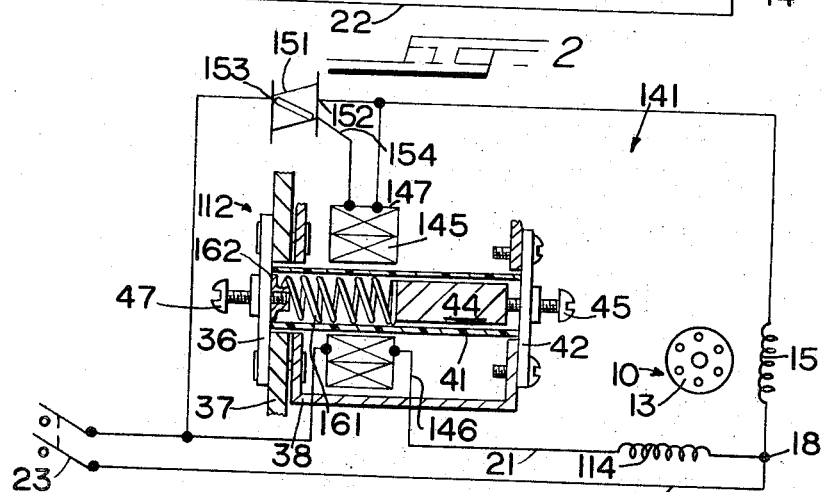
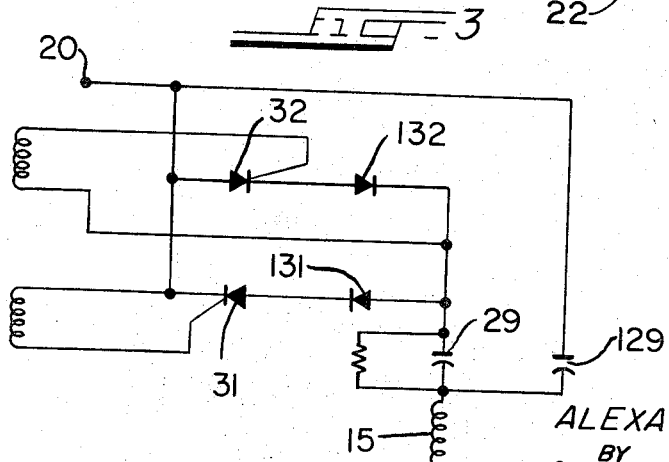
INVENTOR
ALEXANDER J. LEWUS
BY
Wallace, Kinzer & Dorn
ATTYS

# United States Patent Office 3,376,484
Patented Apr. 2, 1968

3,376,484
SEMICONDUCTOR CONTROL CIRCUIT
WITH MOVING IRON CORE
Alexander J. Lewus, 1617 S. 47th Court,
Cicero, Ill. 60650
Filed Oct. 23, 1965, Ser. No. 503,136
8 Claims. (Cl. 318—221)

This invention relates to a new and improved control device and more particularly to a control circuit suitable for use in controlling the operations of a single phase motor of the split-phase or capacitor-start kind. Throughout this specification, and in the appended claims, the expression "capacitor-start motor" includes both capacitor-start capacitor-run and capacitor-start inductance-run motors.

Single-phase electric motors are conventionally provided with two windings, mounted in a stator core, inductively coupled to the rotor of the motor. These two windings, constituting a starting winding and a running winding, are angularly displaced from each other, within the stator core, the construction being such that the starting winding is supplied with a leading or resistive current that is displaced by sixty to ninety degrees electrically with respect to the lagging current in the main winding of the motor. The starting winding is used primarily for starting of the motor. Most frequently, a centrifugally operated switch driven by the motor shaft is used to disconnect the starting winding after the motor has reached a given speed.

In the operation of conventional single-phase electric motors, whether of the capacitor-start inductance-run, capacitor-start capacitor-run, or split-phase types, one of the most frequent sources of malfunction is the centrifugal switch or other switching device used to disconnect the starting winding from the electrical circuit when the motor is running. If the motor is started and stopped quite frequently, the switch or relay contacts may arc excessively and may deteriorate to a point where the motor will not function properly even though the motor structure itself is good for a much longer life. The switch or relay also may accumulate dust, dirt, and other materials and may eventually jam, preventing effective starting or tending to maintain the starting winding of the motor in circuit after it should be disconnected. In the latter circumstance, the motor may overheat, substantially reducing the effective life of the motor. Furthermore, the conventional control arrangements for single-phase motors frequently produce substantial difficulties with respect to reversing the direction of rotation of the motor, particularly when the direction of rotation is reversed under load conditions.

Proposals have been advanced for control circuits for single phase motors, including motors of either split-phase or capacitor-start types, that require no mechanical switching of any kind and thereby eliminate many of the problems and difficulties discussed above. A particularly advantageous motor control circuit of this kind is described and claimed in the pending application of Alexander J. Lewus Ser. No. 362,764, filed Apr. 27, 1964. In the control circuit described in that application, the power supply to the starting winding is actuated by a signal-controlled semi-conductor gate device, the gate device in turn being actuated by a control signal derived from a current transformer connected in the power circuit for the main winding of the motor. The gate device, which may comprise a pair of signal controlled rectifiers, a triac device, or even a power transistor, is triggered to a conductive operating condition by a control signal above a predetermined threshold level and corresponding to the inrush of starting current to the motor. When the motor reaches normal running condition, however, the control signal is not of sufficient amplitude to maintain the gate in conductive condition and the starting winding of the motor is thus effectively disconnected from its power supply. The present invention constitutes an improvement on the control device of application Ser. No. 362,764 and is intended to improve the sensitivity of the device and to afford other advantages in operation of the device.

It is an object of the present invention, therefore, to provide a new and improved highly sensitive control circuit for a single phase electric motor of the capacitor-start or split-phase type, employing a solid state semiconductor switching device to control energization of the starting winding of the motor, that affords a high sensitivity with respect to changes in the load current drawn by the main winding of the motor.

Another object of the invention is to provide a new and improved control unit for the starting winding of a single phase electric motor, utilizing a solid state semiconductor switching device, that provides for clear differentiation between the current levels for the main winding at which the starting winding is energized and de-energized.

A specific object of the invention is to provide for effective and accurate adjustment of the current level on which the starting winding of a two phase motor is energized without requiring corresponding adjustment of the current level at which the starting winding is de-energized.

Another object of the invention is to avoid undesirable false triggering or hunting in the operation of the starting winding of a single phase electric motor of the split-phase or capacitor-start kinds, where energization of the starting winding is controlled by a solid-state semiconductor control device.

An additional object of the invention is to provide a sensitive control device, actuated in response to changes in the load current to a main load, that is effective to energize and de-energize an auxiliary load without entailing mechanical switching and with a high degree of sensitivity in its operation.

Accordingly, the present invention is directed to a control circuit primarily intended for use with a single phase electric motor of the split-phase or capacitor-start kinds, but applicable also to other control arrangements in which an auxiliary load must be energized or de-energized in accordance with changes in the amplitude of load current drawn by a main load. In the case of a single phase motor, the main load comprises the main winding of the motor and the auxiliary load constitutes the starting winding of the motor. A control circuit constructed in accordance with the invention comprises power circuit means for connecting the main winding to an appropriate power supply, and sensing transformer means having a primary winding connected to the power circuit means and having a secondary winding for developing a control signal. The control circuit further includes a starting circuit means for connecting the starting winding to a power supply. A signal-controlled semiconductor gate device is incorporated in the control circuit with the input and output electrodes of the device connected in series in the starting circuit and with the control electrode of the gate device connected to the secondary winding of the sensing transformer means, the gate device serving to open and close the starting circuit in response to the control signal from the sensing transformer means. A magnetic core is located within the magnetic field of the primary winding of the sensing transformer means, this core being movable from a first position in which it affords only limited coupling between the transformer windings to a second position in which the core affords substantially greater coupling, this movement occurring whenever the load current to the main winding exceeds a first threshold amplitude. In addition, means are provided for restoring the magnetic core to its first position whenever the motor load current falls below a second threshold amplitude. This restoring means may be provided by gravity, using a vertical orientation for the movable core, or may be provided by a positive restoring mechanism such as a spring.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 illustrates a single phase dual voltage capacitor-start motor connected in a control circuit constructed in accordance with one embodiment of the present invention;

FIG. 2 illustrates a split phase motor connected in a control circuit constructed in accordance with another embodiment of the present invention; and FIG. 3 is a detail circuit diagram illustrating a modification of the control circuit illustrated in FIG. 1.

FIG. 1 illustrates a capacitor start motor 10 of conventional construction connected in a control circuit 11 comprising one embodiment of the present invention, the control circuit 11 incorporating therein a magnetically actuated control device 12 illustrated in a sectional elevation view. Motor 10 includes the usual armature 13, which may be of the wound rotor type but more frequently would comprise a conventional squirrel cage rotor. The particular construction employed for the rotor, which may be of the high resistance or of the low resistance type, is not critical to the present invention. For example, armature 13 may be constructed with individually wound wire coils mounted in slots in the usual laminated core structure; it may equally well comprise die cast conductors instead of the wire coils. Armature 13 may be mounted upon the usual motor shaft.

Motor 10 further includes the usual field windings, comprising a main or running winding 14 and a starting winding 15. In the illustrated construction, the main winding 14 is made in two sections 16 and 17 with the two winding sections equally distributed in the stator core of the motor to produce a uniform magnetic field. Assuming motor 10 to be a 230/115 volt motor, it is seen that the winding sections 16 and 17 are connected in series for 230 volt operation in FIG. 1. The two winding section terminals 18 and 19 are connected together and one end of the starting winding 15 is connected to terminal 18.

The main winding 14 of motor 10 is connected to a suitable single phase power supply (not shown) by power circuit means comprising a pair of conductors 21 and 22 and an appropriate starting switch 23. Switch 23 is shown as a conventional double-pole single-throw motor starting switch. Of course, the power circuit means for the main winding of the motor may include suitable overload protection in the form of fuses or circuit breakers. Moreover, the manually operable switch 23 may be replaced by a suitable electrically operated contactor or other conventional motor starting switch as desired.

The control circuit 11 of FIG. 1 comprises a sensing transformer 25 that is a part of the control device 12. The sensing transformer 25 includes a primary winding 26 and two secondary windings 27 and 28. The windings are preferably concentric and may be wound in interleaved fashion if desired. The sensing transformer 25 is a current transformer, primary winding 26 being connected in series in the conductor 21 that connects the power supply to the first winding section 16 of the main running winding 14 of motor 10. The secondary windings 27 and 28 of sensing transformer 25 are employed to develop a control signal that is generally representative of the current amplitude in power line 21 and hence representative of the load current drawn by the main winding 14 of motor 10. The relationship between the current in primary winding 26 and the control signals developed by secondary windings 27 and 28 is not a directly proportional relationship, however, as explained more fully hereinafter.

As noted above, motor 10 is a dual voltage motor shown connected for high voltage operation. To re-connect the motor for low voltage operation, terminal 18 is disconnected from terminal 19 and re-connected directly to power line 22. Terminal 19 is then re-connected to terminal 20 on line 21. The latter connection is made between primary winding 26 and the starting switch 23 so that the current conditions in primary winding 26 are essentially the same for high voltage operation and for low voltage operation.

Control circuit 11 further includes starting circuit means for connecting the starting winding 15 of the motor to the power supply through the main starting switch 23. Motor 10 is a capacitor-start motor; a capacitor 29 is connected in series with starting winding 15. Typically, capacitor 29 is an intermittent duty capacitor, usually an electrolytic capacitor, of the kind conventionally employed for starting duty only in single-phase motors.

Control circuit 11 further includes two signal-controlled semiconductor gate devices 31 and 32. Device 31 comprises a silicon signal-controlled rectifier (SCR) having input and output electrodes comprising an anode and a cathode and further having a gate electrode 33 for controlling conduction between the anode and the cathode of the rectifier. The anode of rectifier 31 is connected to capacitor 29 and the cathode of the rectifier is connected directly to conductor 21 in the power circuit for the motor, this connection being made at terminal 20. The gate electrode 33 of rectifier 31 is connected to one terminal of secondary winding 27 of sensing transformer 25, the other terminal of winding 27 being connected to the cathode of rectifier 31.

A similar circuit arrangement is used for the second signal controlled rectifier 32, but the polarity is reversed. Thus, the anode of rectifier 32 is connected to terminal 20 of conductor 21 in the power circuit for the motor and the cathode of this rectifier is connected to capacitor 29. The gate electrode 34 of rectifier 32 is connected to one terminal of the secondary winding 28 of the sensing transformer. The other terminal of secondary winding 28 is connected to the cathode of rectifier 34. A bleed resistor 35 may be connected in parallel with capacitor 29.

The control device 12, of which sensing transformer 25 constitutes a part, comprises a mounting plate 36 for supporting the device upon a suitable base member 37. A C-shaped frame member 38 is suspended from base 37 by means of suitable connector members 39, which may comprise conventional rivets, screws, or other fastening devices. Frame member 38 should be fabricated from a non-magnetic material such as brass or aluminum. Core 44 normally rests on an adjustment member 45 that is axially aligned with guide tube 41 and projects upwardly into the guide tube. Adjustment member 45 may constitute an ordinary screw threaded into an appropriate nut 46 mounted upon mounting member 42. The magnetic characteristics of adjustment member 45 are not particularly important. A second adjustment member 47 is similarly mounted upon mounting member 46 projecting downwardly into guide tube 41 in axial alignment therewith.

To start motor 10, switch 23 is closed, connecting the two sections 16 and 17 of main winding 14 is series across an appropriate AC power supply. The initial inrush of starting current to the main winding of the motor, passing through the primary winding 26 of sensing transformer 25, develops a substantial magnetic field that extends axially of the upper portion of guide tube 41. It should be noted that core 44 is located close enough to primary winding 26 so that it is positioned at least partially within the magnetic field of the primary winding. As a consequence, core 44 is pulled upwardly from its first position, as illustrated in FIG. 1, to a second position in which the core is centrally located with respect to the transformer windings 26–28. Thus, although core 44 affords only very limited coupling between the primary winding 26 and the secondary windings 27 and 28 of the sensing transformer when the core is in its first position, as shown in FIG. 1, it provides substantially greater coupling between the transformer windings when pulled upwardly to its second operating position in response to the strong magnetic field developed by primary winding 26 when subjected to the high starting current of motor 10.

With core 44 pulled upwardly to its second operating position, as described above, control signals of substantial amplitude are developed in the secondary windings 27 and 28 of the sensing transformer 25 that constitutes a part of control device 12. For each half cycle of the supply voltage in which conductor 21 is driven positive with respect to conductor 22, a current pulse is supplied from conductor 21 through the anode-cathode path in gate device 32 and through capacitor 29 to the starting winding 15 of the motor, the return circuit extending from terminal 18 through running winding section 17 and back to conductor 22. In the alternate half cycles, the current for the starting winding goes from conductor 22 through main winding section 17 and terminal 18 to starting winding 15 and then through capacitor 29 and the anode-cathode path of guide device 31 back to conductor 21. Thus, starting winding 15 is effectively connected in a complete starting circuit, through the two signal controlled rectifiers 31 and 32, to the same power supply that energizes the main winding 14 of motor 10. This operating condition remains in effect as long as core 44 is held in its second or elevated condition, providing effective coupling between the primary and secondary windings of the sensing transformer induction and developing control signals of sufficient amplitude in the secondary windings to maintain the signal controlled rectifiers 31 and 32 in conductive condition.

As motor 10 builds up in EMF and approaches running speed, the current to running winding 14 progressively reduces. When the current through transformer primary 26 drops below a given threshold value, the magnetic field developed by winding 26 is no longer sufficient to maintain core 44 suspended in position to afford effective coupling between the primary and secondary windings of the sensing transformer. When this occurs, core 44 drops back to its first position, as illustrated in FIG. 1, being restored to that position as the result of gravity and the weight of the magnetic core. As a consequence, the inductive coupling between the primary and secondary windings of transformer 25 is materially reduced, since there is no longer an effective low reluctance core present in the transformer. When this occurs, the amplitudes of the control signals developed in the secondary windings 27 and 28 of transformer 25 are no longer sufficient to maintain the signal controlled rectifiers 31 and 32 in conductive condition. Since the current in the anode-cathode path of each of the two SCR's goes to zero in each cycle of the supply current, the signal-controlled rectifiers cease conduction and starting winding 15 is cut out of its operating circuit almost instantaneously when core 44 drops back to its original position.

During continuing operation of motor 10, if excessive load conditions are encountered the current in the main power circuit 21, 22 may again become high enough to create a sufficient magnetic field at the transformer primary 26 to pull core 44 upwardly to its second position and again afford relatively high inductive coupling between the transformer primary and the secondary windings 27 and 28. If this happens, the transformer again develops a control signal of sufficient amplitude to trigger the gate devices 31 and 32 to conductive condition and thus again connect the starting winding 15 to the power supply. As before, this condition is maintained only so long as core 44 is held elevated in response to very high current through the transformer primary 26, the core dropping back to its first position upon a significant reduction in the motor current.

Control device 12, as incorporated in the circuit arrangement of FIG. 1, affords relatively sharp cut-off characteristics in the operation of the starting circuit of motor 10. Thus, whenever the current through primary winding 26 drops below the minimum threshold required to maintain core 44 in elevated position, the core drops to its initial position. The resultant reduction in coupling between the transformer primary and secondary windings immediately reduces the control signal developed by the secondary windings to a level that cannot maintain conduction through gate devices 31 and 32. Thus, highly sensitive operation is achieved without requiring the introduction of mechanically movable contacts with the concomitant arcing and other difficulties associated therewith.

It is also important to note that the amplitude of current through line 21 that will move core 44 to its upper coupling position can be adjusted by means of adjustment member 45 without materially affecting the current level at which the core drops back to its lower initial position. Thus, if adjusting screw 45 is advanced to raise the first position of core 44 further into the magnetic field of winding 26, the magnetic core is moved upwardly to its second position at a somewhat lower current. This does not change the current level required to maintain the magnetic core in the elevated second position. Furthermore, device 12 prevents undesirable false triggering or "hunting" in the operation of the gate devices 31 and 32, due to the very substantial change in coupling between the primary and secondary windings of the sensing transformer resulting from movement of core 44.

To afford a more specific example of the invention and to demonstrate more fully its operating characteristics, consideration may be given to a specific construction for control of a conventional one-fourth horsepower 60 cycle 115 volt motor having a nominal operating speed of 1150 r.p.m. with a locked rotor current in the running winding of fifteen amperes and a starting winding current of thirteen amperes. With such a motor, and utilizing the circuit illustrated in FIG. 1, device 12 is constructed to elevate core 44 to its second position, affording high inductive coupling between the transformer windings, in response to the fifteen-ampere starting current. As the motor starts and accelerates to approximately 800 r.p.m., the current to the main winding of the motor decreases to about thirteen amperes. When the current reaches this lower level, core 44 drops back to its initial low-coupling position. As a consequence, the control signal developed by secondary windings 27 and 28, initially approximately 0.6 volt, drops abruptly to 0.3 volt. At the lower level, the control signal is not of sufficient amplitude to maintain gate devices 31 and 32 in conductive condition, so that these devices effectively disconnect the starting winding of the motor at this point in operation.

The high sensitivity of the device of the present invention is made apparent by the fact that a variation of between one and three amperes in the load current to the main winding of the motor can be effectively detected and utilized to switch the starting winding of the motor into and out of the operating circuit. The construction of the circuit, and particularly device 12, is quite simple and inexpensive yet highly reliable in operation. The device is particularly advantageous as applied to low speed electrical motors of the split phase or capacitor-start kind, but can also be utilized in other applications such as phase converter systems for energizing electric motors and other loads.

The embodiment of the invention illustrated in FIG. 1 is particularly intended for vertical mounting of device 12. FIG. 2 illustrates another embodiment of the invention that can be employed with the control unit mounted either vertically or horizontally.

Thus, FIG. 2 illustrates another form of control circuit 141 applied to the control of a split-phase motor 10 comprising the usual armature 13 inductively coupled to a starting winding 15 and a single-voltage running winding 114. The power circuit connections for the running winding 114 are the same as before, comprising the power conductors 21 and 22 connected through a starting switch 23 to an appropriate AC supply. As before, starting winding 15 is connected to running winding 114 at terminal 18.

Control circuit 141 includes a control device 112 comprising a sensing transformer 145. Sensing transformer 145 includes a primary winding 146 that is connected in series in the power conductor 21 for the main winding of the motor. The sensing transformer further includes a single secondary winding 147. As before, the transformer windings are of toroidal configuration.

The principal control element in circuit 141, other than device 112, is a triac 151 having input and output electrodes 152 and 153 and a gate electrode 154. A triac is a three electrode AC semiconductor switch that is triggered into conduction by a gate signal or control signal in a manner similar to the action of a conventional signal-controlled rectifier, but differs from the usual SCR because it can conduct in both directions of current flow in response to either a positive or a negative gate signal. In a triac, the region between the input and output electrodes 152 and 153 constitutes, essentially, a PNPN switch in parallel with a NPNP switch. Each of the input and output electrodes 152 and 153 functions both as a cathode and as an anode and the triac can be triggered to conductive condition by a control voltage of sufficient amplitude, regardless of polarity, across the gate electrode 154 and electrode 152.

In control circuit 141, electrode 153 is connected to conductor 21 in the power supply circuit for motor 10. Electrode 152 is connected to starting winding 15. Electrode 152 is also connected to one terminal of the secondary winding 147 of sensing transformer 145, the other terminal of winding 147 being connected back to the gate or trigger electrode 154.

Control device 112 is generally similar to device 12 of FIG. 1 but is somewhat different in its specific construction. As before, the control device comprises a first mounting member 36 for mounting a U-shaped non-magnetic frame member 38 on a base 37. A second mounting member 42 is mounted on frame member 38 at the end thereof opposite base 37. It is thus seen that the basic frame structure is the same as in FIG. 1 except that the device is turned 90° so that the non-magnetic guide tube 41 that extends between the two legs of the frame member is oriented in a horizontal direction. As before, a magnetic core 44 is disposed within guide tube 41, the initial position for the core being determined by the adjustment member 45 that extends from mounting member 42 into guide tube 41.

In this instance, however, gravity is not employed to restore core 44 to its initial position. A compression spring 161 is mounted within guide tube 41. One end of spring 161 engages core 44 and the opposite end of the spring is seated in a retainer cup 162. The retainer cup 162 is engaged and positioned by the second adjustment member 47.

In most respects, operation of control circuit 141 proceeds essentially similarly to control circuit 11. Thus, upon closing of switch 23 in FIG. 2, the high starting current to the main winding 114 of motor 10 produces a strong magnetic field, from primary winding 146 of the sensing transformer, that pulls magnetic core 44 into the air space encompassed by the two transformer windings. Movement of the magnetic core from its first position, as illustrated, to the left to its second position within the transformer coils, materially increases the coupling between the transformer coils. As a consequence, a control signal voltage of substantial amplitude is developed across secondary winding 147 and applied to electrodes 152 and 154 of the semiconductor gate device, the triac 151. The triac is thus triggered to conduction and energizes starting winding 15 of the motor. As noted above, the triac is an AC device; hence, winding 15 receives an unrectified AC current.

Subsequently, as motor 10 approaches running conditions, the current to main winding 114 begins to reduce in amplitude. At a predetermined threshold value, established by the weight of core 44, the characteristics of spring 161, and the settings of adjustment members 45 and 47, the strength of the magnetic field from winding 146 drops to a point where it can no longer maintain core 44 in its left-hand or second position as seen in FIG. 2. When this occurs, spring 161 drives core 44 to the right, restoring it to its initial position. The resultant substantial reduction in coupling between the primary and secondary windings of the transformer reduces the control signal supplied to electrodes 152 and 154 to a level at which conduction is no longer maintained in triac 151. Consequently, the semiconductor gate device reverts to its non-conductive condition and effectively switches winding 15 out of the motor operating circuit. This condition obtains until such time as a subsequent heavy load on motor 10, equivalent to a stalling load, again causes motor winding 114 to draw a high enough current to cause the magnetic field of transformer winding 146 to pull core 44 to the left to its second or high-coupling position.

With respect to the adjustments possible with control device 112, there is some inter-action between the two adjustment members 45 and 47. Thus, if adjustment member 45 is advanced to the left, moving the initial position of core 44 to the left, as seen in FIG. 2, the core is moved further into the magnetic field of winding 146. This lowers the current level necessary to pull core 44 to its second or high coupling position. However, advancement of the first position of the core to the left also may compress spring 161 to some extent. Thus, to assure effective adjustment of the first threshold current amplitude at which core 44 is actuated to its second position, effectively coupling coils 146 and 147, adjustment member 47 may also have to be moved leftward somewhat.

On the other hand, advancement of adjustment member 47 to the right, without a corresponding adjustment of member 45, compresses spring 161 and tends to elevate the amplitude at which spring 161 will be effective to drive core 44 back to its original position. It is thus apparent that the adjustments afforded by members 45 and 47 are somewhat inter-related. However, it is a relatively simple matter to adjust these two movable stops to achieve desired threshold levels for movements of the magnetic core to and from its first and second operating positions.

FIG. 3 illustrates a modification of the circuit arrangement of FIG. 1 for utilization with a capacitor-start capacitor-run motor, with additional modifications pertaining to the gate devices 31 and 32. Thus, for a motor requiring permanent coupling of the starting winding 15 into the operating circuit, but utilizing capacitor 29 only for starting duty, a continuous duty capacitor 129 may be connected directly from winding 15 back to power terminal 20, by-passing the two signal controlled rectifiers 31 and 32. It is thus seen that the basic circuit remains unchanged for operation of a capacitor-start capacitor-run motor, as compared with the capacitor-start inductance-run arrangement illustrated in FIG. 1, the connection for the running capacitor 129 by-passing the control circuit comprising gate devices 31 and 32.

In the arrangement illustrated in FIG. 3, a diode 131 is connected in series with rectifier 31, being polarized in the same direction as the signal-controlled rectifier. Similarly, a diode 132 is connected in series with the signal-controlled rectifier 32. The two diodes 131 and 132 serve to reduce the total voltage appearing across the signal controlled rectifiers, making it possible to utilize signal-controlled rectifiers of a reduced voltage rating. With this arrangement lower-priced SCR's can be incorporated in the control circuit of the invention without substantial sacrifice in performance, enhancing the commercial value of the invention.

Each of the several embodiments of the invention can be applied to split-phase and to both forms of capacitor-start motor, as will be clear from the foregoing description. In each, the signal-controlled semiconductor gate devices employed (the SCR's 31, 32, the triac 151) tend to increase the motor pull-in and breakdown torques, due to an apparent inherent capacitance effect.

Hence, while preferred embodiments of the invention have been described and illustrated, it is to be understood that they are capable of variation and modification.

I claim:

1. A control circuit for an electric motor including a main winding and a starting winding angularly displaced from each other in a stator core and inductively coupled to a rotor, comprising:
   power circuit means for connecting said main winding to a power supply;
   sensing transformer means, having a primary winding coupled to said power circuit means and having a secondary winding for developing a control signal;
   starting circuit means, for connecting said starting winding to a power supply;
   a signal-controlled semiconductor gate device, having input and output electrodes connected in series in said starting circuit means, and having a control electrode connected to said secondary winding of said sensing transformer means, for opening and closing said starting circuit means in response to said control signal;
   a magnetic core located within the magnetic field of said primary winding and movable from a first position in which said core affords only limited coupling between said windings to a second position in which said core affords substantially greater coupling between said windings whenever the load current to said main winding exceeds a first threshold amplitude;
   and means for restoring said magnetic core to its first position whenever the motor load current falls below a second threshold amplitude.

2. A control circuit for an electric motor including a main winding and a starting winding angularly displaced from each other in a stator core and inductively coupled to a rotor, comprising:
   power circuit means for connecting said main winding to a power supply;
   sensing transformer means, having a primary winding coupled to said power circuit means and having a secondary winding for developing a control signal, said windings being of concentric construction with an axial air space therethrough;
   starting circuit means, for connecting said starting winding to the power supply;
   a signal-controlled semiconductor gate device, having input and output electrodes connected in series in said starting circuit means, and having a control electrode connected to said secondary winding of said sensing transformer means, for opening and closing said starting circuit means in response to said control signal;
   a magnetic core movable from a first position adjacent one end of said air space, in which said core affords only limited coupling between said windings, to a second position in which said core extends into said air space and affords substantially greater coupling between said windings, whenever the load current to said main winding exceeds a first threshold amplitude;
   means for restoring said magnetic core to its first position whenever the motor load current falls below a second threshold amplitude;
   and adjustment means for varying said first position of said core to adjust said first threshold amplitude.

3. A control circuit for an electric motor including a main winding and a starting winding angularly displaced from each other in a stator core and inductively coupled to a rotor, comprising:
   power circuit means for connecting said main winding to a single-phase power supply;
   sensing transformer means, having a primary winding coupled in series with said power circuit means and having first and second secondary windings for developing control signals;
   starting circuit means, for connecting said starting winding to a power supply;
   first and second signal-controlled semiconductor gate devices, each comprising a signal-controlled rectifier having input and output electrodes connected in series in said starting circuit means, said gate devices being connected in reversed polarity relative to each other and each having a control electrode connected to a respective one of said first and second secondary windings of said sensing transformer means, for opening and closing said starting circuit means in response to said control signals;
   a magnetic core located within the magnetic field of said primary winding and movable from a first position in which said core affords only limited coupling between said primary and secondary windings to a second position in which said core affords substantially greater coupling between said windings whenever the load current to said main winding exceeds a first threshold amplitude;
   means for restoring said magnetic core to its first position whenever the motor load current falls below a second threshold amplitude;
   and first and second diodes connected in series with said first and second gate devices, respectively, to reduce the voltage requirements of said gate devices.

4. A control circuit for an electric motor including a main winding and a starting winding angularly displaced from each other in a stator core and inductively coupled to a rotor, comprising:
   power circuit means for connecting said main winding to a power supply;
   sensing transformer means, having a primary winding coupled to said power circuit means and having a secondary winding for developing a control signal;
   starting circuit means, for connecting said starting winding to a power supply;
   a signal-controlled semiconductor gate device, having input and output electrodes connected in series in said starting circuit means, and having a control electrode connected to said secondary winding of said sensing transformer means, for opening and closing said starting circuit means in response to said control signal;
   a magnetic core located within the magnetic field of said primary winding and movable along a given path from a first position in which said core affords only limited coupling between said windings to a second position in which said core affords substantially greater coupling between said windings whenever the load current to said main winding exceeds a first threshold amplitude;
   means, comprising a compression spring biasing said core toward said first position, for restoring said magnetic core to its first position whenever the motor load current falls below a second threshold amplitude;

and adjustment means for adjusting both of said threshold amplitudes, said adjustment means comprising first and second stop members located at and determining the location of the opposite ends of said path.

5. A control circuit for an electric motor including a main winding and a starting winding angularly displaced from each other in a stator core and inductively coupled to a rotor, comprising:

power circuit means for connecting said main winding to a power supply;

starting circuit means, for connecting said starting winding to a power supply;

sensing transformer means, having a toroidal primary winding coupled to said power circuit means and having a concentric toroidal secondary winding for developing a control signal, said windings having a vertically extending axis;

a signal-controlled semiconductor gate device, having input and output electrodes connected in series in said starting circuit means, and having a control electrode connected to said secondary winding of said sensing transformer means, for opening and closing said starting circuit means in response to said control signal;

a magnetic core axially aligned with said windings and movable from a first position immediately below said windings, in which said core affords only limited coupling between said windings, to a second position within said windings in which said core affords substantially greater coupling between said windings, whenever the load current to said main winding exceeds a first threshold amplitude;

and means for guiding vertical movements of said magnetic core to restore said magnetic core to its first position in response to gravity whenever the motor load current falls below a second threshold amplitude.

6. A control circuit for apparatus comprising a main controlled unit and an auxiliary controlled unit, comprising:

first power circuit means for connecting said main unit to a power supply;

sensing transformer means, having a primary winding coupled to said first power circuit means and having a secondary winding for developing a control signal;

second power circuit means, for connecting said auxiliary unit to a power supply;

a signal-controlled semiconductor gate device, having input and output electrodes connected in series in said second power circuit means, and having a control electrode connected to said secondary winding of said sensing transformer means, for opening and closing said second power circuit means in response to said control signal;

a magnetic core located within the magnetic field of said primary winding and movable from a first position in which said core affords only limited coupling between said windings to a second position in which said core affords substantially greater coupling between said windings whenever the load current to said main unit exceeds a first threshold amplitude;

and means for restoring said magnetic core to its first position whenever the load current to said main unit falls below a second threshold amplitude.

7. A control circuit according to claim 1 and further including a starting capacitor connected in said starting circuit means in series with said gate device and a running capacitor connected in said starting circuit means in parallel with said gate device to afford a permanent circuit connection to said starting winding.

8. A control circuit according to claim 3 and further including a starting capacitor connected in said starting circuit means in series with said gate device and a running capacitor connected in said starting circuit means in parallel with said gate device to afford a permanent circuit connection to said starting winding.

References Cited
UNITED STATES PATENTS 3,116,445  12/1963  Wright _____ 318—220
3,226,620  12/1965  Elliot et al. _____ 318—221

ORIS L, RADER, *Primary Examiner.*

G. Z. RUBINSON, *Assistant Examiner.*